US00RE44615E

(19) United States
(12) Reissued Patent
Keenan

(10) Patent Number: US RE44,615 E
(45) Date of Reissued Patent: Dec. 3, 2013

(54) VOTER INFORMATION SYSTEM

(76) Inventor: Vincent M. Keenan, Detroit, MI (US)

(21) Appl. No.: 13/188,049

(22) Filed: Jul. 21, 2011

Related U.S. Patent Documents

Reissue of:
(64) Patent No.: 7,562,819
Issued: Jul. 21, 2009
Appl. No.: 10/869,569
Filed: Jun. 16, 2004

U.S. Applications:
(63) Continuation-in-part of application No. 10/642,470, filed on Aug. 14, 2003, now abandoned.

(60) Provisional application No. 60/403,603, filed on Aug. 14, 2002, provisional application No. 60/408,805, filed on Sep. 6, 2002.

(51) Int. Cl.
*G06K 17/00* (2006.01)

(52) U.S. Cl.
USPC ..... 235/386; 705/12; 709/203

(58) Field of Classification Search
USPC ..... 235/386; 705/12; 709/203
See application file for complete search history.

(56) References Cited

U.S. PATENT DOCUMENTS

| | | | | |
|---|---|---|---|---|
| 6,250,548 | B1 | 6/2001 | McClure et al. | |
| 6,557,013 | B1 * | 4/2003 | Ziff et al. | 707/205 |
| 6,640,213 | B1 * | 10/2003 | Carp et al. | 705/10 |
| 2002/0029163 | A1 * | 3/2002 | Joao | 705/12 |
| 2002/0059402 | A1 * | 5/2002 | Belanger | 709/220 |
| 2002/0069295 | A1 * | 6/2002 | Edwards et al. | 709/246 |
| 2002/0083126 | A1 * | 6/2002 | Best et al. | 709/203 |

OTHER PUBLICATIONS

Smart Voter Nonpartisan Election Information, Nov. 7, 2000, http://www.smartvoter.org/2000/11/07.*
Smart Voter Nonpartisan Election Information, Nov. 7, 2000, Presidential Candidates and Links, http://www.smartvoter.org/2000/11/07/us/fed/race/pres/.*
Smart Voter Nonpartisan Election Information, Nov. 7, 2000, California Directory of Contests http://www.smartvoter.org/2000/11/07/ca/.*
Smart Voter Nonpartisan Election Information, Nov. 7, 2000, California Directory of Contests, Alameda County, http://www.smartvoter.org/2000/11/07/ca/alm/.*
Smart Voter Nonpartisan Election Information, Nov. 7, 2000, California Directory of Contests, Alameda County, Alameda County Voting Results, http://www.smartvoter.org/2000/11/07/ca/alm/county.html.*
John Hagelin Candidate Page, Nov. 10, 2000, http://web.archive.org/web/20001110213206/http:/www.hagelin.org/.*

(Continued)

*Primary Examiner* — Kristy A Haupt
(74) *Attorney, Agent, or Firm* — Brooks Kushman P.C.

(57) ABSTRACT

A method for providing voters with election information specific to voter polling location. A voter registration file is queried for a name of a registered voter in response to an input from a user. The user is queried for additional narrowing information through a series of single criterion iterations each time the query renders more than one result. The user is notified of multiple results after each single criterion iteration is processed to show the progress of the initial query. The user is granted access to a information page if the user is found in the voter registration file. The information page presents the user with relevant information based on the user polling location.

46 Claims, 2 Drawing Sheets

(56) References Cited

OTHER PUBLICATIONS

John Hagelin Videos, Nov. 10, 2000, http://web.archive.org/web/20001112133243/www.hagelin.org/soundbytes/davidlynch.htm.*
Smart Voter Nonpartisan Election Information, Voter FAQ, Nov. 10, 2000, http://www.smartvoter.org/voter/faqvoter.html.*
Youth Leadership Initiative, Nov. 21, 2000, http://web.archive.org/web/20001121220000/http://www.youthleadership.net/.*
SmartVoter Nonpartisan Election Information, Candidate Information, Nov. 10, 2000, http://web.archive.org/web/20000815063631/www.smartvoter.org/voter/tocand.html.*
FEC/gov's About Elections and Voting, Mechanical Lever Machine, Oct. 1, 2000, http://web.archive.org/web/20001010154433/www.fec.gov/pages/lever.htm.*
FEC.gov's About Elections and Voting, Oct. 1, 2000, http://web.archive.org/web/20001019064809/www.fec.gov/pages/electpg.htm.*
Election Data Services, Jan. 24, 2001, http://web.archive.org/web/20019127211000/www.electiondataservices.com/content/electionadmin.htm.*
Dallas County Elections, Feb. 5, 2002, http://webarchive.org/web/20020205115802/http://dalcoelections.org/voters.asp.*
Dallas County Elections, Aug. 3, 2001, http://web.archive.org/web/20010803224834/http://dalcoelections.org/voters.asp.*
Declaration of Vincent M. Keenan with exhibits.

* cited by examiner

VOTER INFORMATION SYSTEM

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of U.S. application Ser. No. 10/642,470 filed Aug. 14, 2003 now abandoned, which, in turn, claims the benefit of U.S. provisional application Ser. No. 60/403,603 filed Aug. 14, 2002 and U.S. provisional application Ser. No. 60/408,805 filed Sep. 6, 2002.

BACKGROUND OF THE INVENTION

1. Field of the Invention

The present invention relates to a system for conveniently providing information to users via a network regarding public information that may require some protected information to be referenced to refine searches, such as ballot content, poll information and other information regarding elections and government.

2. Background Art

A key to democratic and representative government is an informed electorate. When interacting with government, citizens must often search through irrelevant data to find information that is pertinent and often must divulge personal information to increase efficiency. As an example, in many elections a large number of candidates vie for legislative, executive, and judicial offices at the federal, state, and local levels of government. In addition, complex ballot proposals relating to public initiatives, tax assessments and other issues frequently appear on ballots. Mass media information sources such as radio, television and newspapers cover broad geographic areas and focus on federal and state candidates and issues. Consequently, less media attention is given to local elections and local ballot proposals, many of which are almost completely ignored by the media. Voters must wade through information regarding many local candidates and ballot proposals that they do not have the opportunity to vote for to locate the candidates and ballot proposals that do appear on their ballots.

One problem encountered in prior art systems is that users with common attributes (e.g., a name is the common initial query) required the system to divulge information in the voter file to narrow the search parameters. In order to differentiate queries about similar attributes (e.g., when users with the same name living in different locations query the database) previous systems would display additional attributes to prompt the user to differentiate himself. These systems provided the user with other identifying information associated with the names, such as the city, the street of residence or the ZIP code. The excess information represented an unnecessary exposure of personal information and the system became exponentially difficult to navigate based on the recurrence of the original attribute queried in the database.

Government agencies have attempted to provide ballot data for major elections but a comprehensive system that provides a convenient way to access all local ballots, candidates and proposals has not been developed. In one election, ballot content information was made available based on identification of a location on a map corresponding to a voter's address. Many systems used ZIP code searches to access election information. However, ZIP codes do not directly correspond to the jurisdictions. Users needed to input their ZIP+4 codes, which are often not widely known. Other systems use a series of increasingly granular maps of progressively greater detail to allow users to select or "drill-down" to relevant ballot data, which required voters to visually recognize the geographical boundaries of their districts. Some systems use direct address searches, but address searches require a great deal of information and do not provide information on registration status. In another attempt to provide voters with information, electronic voter guides provide candidates with an opportunity to post biographical data and data relating to political issues in lieu of candidate websites. This approach has been problematic because many candidates (even those with campaign websites) fail to provide biographical data.

Campaign finance information required by the federal and state election laws is made available to the media and the voter. Voters in some states may access campaign finance information via the same mapping system that is used to identify candidates who are elected from a specific precinct or district. This process of searching by starting with wide-area maps and then "drilling down" by selecting smaller geographic regions within those maps is better suited to the needs of lobbyists, the media, and political candidates than to the needs of voters. Lobbyists, reporters, and candidates who are familiar with the geography of voting districts can use the drill-down mapping system to research candidate submissions and campaign finance information and get a broad view of the regional political activities. Individual citizens, however, find the same mapping system frustrating and difficult to use when they attempt to identify exactly which candidates and ballot proposals they will need to review.

There is a need for a simple and effective voter information system that can provide every voter with a jurisdiction-specific sample ballot before going to the polling place to cast a vote. There is also a need to provide better access to campaign literature and finance information, polling locations, instructions on how to use the voting machines, and information regarding campaign events in a single system. The system may be easy to use and may use no specialized knowledge of ZIP+4 codes or geographical boundaries of jurisdictions. The system may focus on the candidates and issues found on an individual voter's ballot. The system may display public information without compromising user information.

In order to provide this information, in the prior art, Applicant offered a system publicly that allowed voters to search a state voter registration database (e.g., a voter file) in order to query general election information data to generate a preprocessed partial sample ballot and candidate websites. The problems associated with this prior system is that it failed to identify a voter's polling location. It required substantial processing time to create pre-proposal sample ballots that were incomplete. It also was not easily scalable in that it could not accommodate a large quantity of data required for a complete ballot.

The problems noted above, and other problems relating to providing voter, election and other public information are addressed by applicant's invention as summarized below.

SUMMARY OF THE INVENTION

According to one aspect of the present invention, an improved method for providing election information based upon polling location data obtained from a database is disclosed. According to the method, a user is queried as to an identification data item such as the user's name or identification number. The identification, data item is checked against a database that includes a field corresponding to a plurality of polling locations to select one polling location to which the identification data item is assigned. An information page is then displayed relating to the one polling location if the identification data item is found in the database. The information page presents the user with information relevant to the one polling location.

According to other aspects of the invention, the method may further comprise retrieving a user polling location in the database. The user is presented with an option from the information page to view a sample ballot that the user will encounter when voting on election day. The user may also be presented with an option from the information page to view voter information or candidate information, party information, campaign information, campaign website, or campaign submissions including biographical information provided by the individual candidates. The candidate information may be directly updated by administration personnel in a municipality via a secure connection to the database. The method may further comprise presenting the user with an option to view a regional election overview, voting machine instructions, or a drill down mapping system. The mapping system may enable a user to retrieve at least one map from the map database directing the user to a polling location. Other information may also be provided including a listing of events retrieved from an election events database, town hall meetings, debates and appearances of candidates.

According to still further aspects of the invention, the user may be provided with an option to view information regarding particular candidates including candidate submissions, links to candidate websites, and links to campaign finance information. The information from the database may also include messages in a streaming video format.

The method may also comprise notifying registered voters of election deadlines and events by e-mail. The method may also facilitate presenting a user with contact information regarding voter registration and provide a secure system for updating information and providing data from a voter registration file. The method may also be used to offer access to blind by allowing a user to convert text-to-voice and voice-to-text. The information page could be dynamically generated based upon the jurisdiction of the user recorded in the voter registration file, whereby the database need not store a unique ballot for every user in the voter registration file. The information page may be pre-calculated for statistical correlations and assembled according to the fastest possible construction.

The method may be used for educational purposes and elected officials for purposes other than elections. For example, elected officials may perform a voter query to determine the precinct to which a register voter is assigned. The system may also be used by educators to enable a user to view educational information designed to teach about a political system and a voting process. The system may also be used to permit a user or a group of users to participate in an on-line mock election. The system may also be used to identify currently serving elected officials and also appointed officials.

According to another aspect of the invention, a method for providing voters with election information specific to a voter polling location is provided. According to the method, a voter registration file is initially queried for the name of a registered voter in response to an input from a user. The user is then queried for additional narrowing information through a series of single criterion iterations each time the voter registration file query renders more than one result. The user is notified that multiple results have been obtained after each single criterion iteration is processed. The system dynamically generates an information page if the user is found in the registration file. The information page presents the user with relevant information based upon the user's polling location.

The method may also employ a multiple query system that passes information about user attributes along a back end to not compromise the privacy of any information contained in the voter registration file. The results of the queries are indicated only through non-personal indicators to show the progress of the original query after each single criterion iteration is processed.

According to another aspect of the invention, a voter information system is provided that comprises a voter database containing a record of all registered voters in a defined area. A polling place identifier database classifies the registered voters according to a polling location to which each of the registered voters is assigned. An elected officials database provides information about currently elected officials. An office database provides information about each office that may be held by an elected official. An events database may provide information regarding an election calendar. A candidate database may provide information about candidates running for office. A ballot initiatives database may provide information about ballot initiatives. A map database may provide maps or directions to registered voters to assist the voters in finding polling places assigned to them. The voter database and polling place identifier database are accessible on line. The elected officials database, the office database, the events database, the candidate database, the ballot initiatives database, and the map database may be accessible on line providing geographically targeted information to the voters registered in the voter database based upon their polling location.

According to another aspect of the invention as it relates to the voter information system, a secure access link may be provided to the voter database files and polling place identifier database files. A secured server may be used to provide read/write access to authorized users having secure access to one of the databases.

According to another aspect of the invention as it relates to a method for providing voters with election information, the method comprises finding a single voter in a voter registration file through a series of single criterion iterations. Each iteration asks the user for one additional piece of information about the user while revealing nothing about the voters in the registration file. The user is presented only with public information about the user polling location based upon the user's jurisdiction.

According to yet another aspect of the present invention as it relates to a voter information system, the system comprises a registered voter database containing a record of all registered voters in a defined area and a polling place identifier database that classifies the registered voters according to a polling place to which each of the registered voters is assigned. The system also includes at least one of an elected officials database, an office database, an events database, a candidate database, a ballot initiative database, or a map database. The system is available on line and provides geographically targeted information to voters registered in the registered voter database based upon their polling place.

These and other aspects and advantages of the present invention are better understood in view of the attached drawings and detailed description of the system provided below.

DETAILED DESCRIPTION OF THE PREFERRED EMBODIMENT(S)

Figure 1:
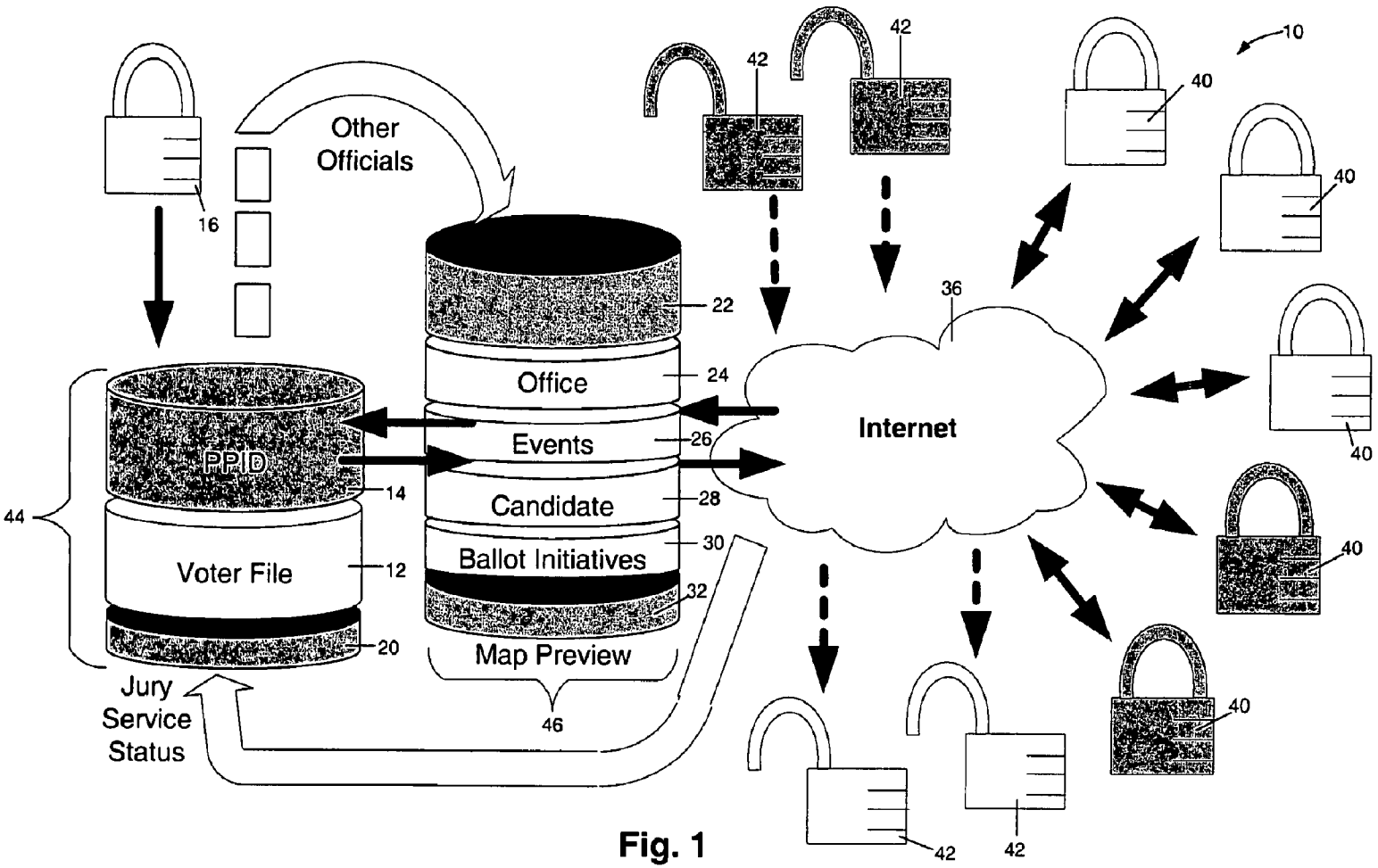
FIG. 1 is a diagrammatic view showing a complete public information system using a single criterion iteration methodology for voter education.

Referring now to FIG. 1, an on-line public/civic information system (e.g., a voter information system) 10 is shown in a diagrammatic form wherein the relational databases and users are shown. The voter information system 10 includes a copy of a voter file 12 that includes a list of all qualified (e.g., registered ) voters maintained by a governmental agency charged with maintaining voter records. The voter file 12 includes identifying information for all registered voters and their corresponding jurisdictions. A polling place identifier database (PPID) 14 contains information on the characteristics of polling locations and jurisdictions. The voter file 12 and the polling place identifier 14 are maintained by an election administrator or clerk having appropriate access and authority to make changes. Public records, such as the voter registration file 12 and the polling place identifier 14 may be stored separately on a secure database 44. A secure user may be part of a direct network maintained on a mainframe computer system. Voter files are maintained by a secure clerk access link 16. For example, if the public information access system is discrete from the official database for security reasons, when a voter registers for the first time or changes his registration when changing residence, information in the official voter registration file is updated and those updates are sent to the voter information system. Other factors may also impact the voter file 12 such as jury service status, as indicated by reference numeral 20. A county clerk charged with responsibility for maintaining jury service records and noting a voter's failure to serve on a jury in the voting record may update a database that is cross-referenced by the voter file 12.

The polling place database 14 may be generated based on all combinations of cities, precincts and/or districts in a state. The system generates jurisdiction region relationships in advance to reduce ballot access time when displaying ballot information to a registered voter when the voter is recognized by the system.

Databases that may be accessed by the voter information system may include an elected officials database 22 that provides information relating to currently serving elected officials, the term of office, address, telephone number, and other information including web sites and e-mail addresses. An office database 24 provides information regarding each office that may be held by an elected official at the local, state, or federal levels. An events database 26 provides information relating to an election calendar including dates of town hall meetings, debates, candidate forums, and election days. A candidate database 28 provides biographical and identifying information for each candidate running for office. The candidate database 28 may include links to external candidate information (e.g., candidate websites), voting records, incumbency status, and campaign finance information. A ballot initiatives database 30 contains the complete text of proposed initiatives and is similar to the candidate database 28. The ballot initiatives database 30 may provide links to supporting, opposing, non-partisan analyses and links to existing legislation that may be modified by each ballot initiative. A map database 32 provides maps or directions to voters to assist them in locating their polling place. All of the databases 22-32 may be accessed in a focused and limited way that provides voters with only relevant information.

The above databases are accessible online (e.g., via an Internet 36) to the public through the Internet and other protocols as they emerge. Clerks 40 with secure read/write access can access the system through the Internet 36 and retrieve information or provide updated information for the events database 26, the candidate database 28, and the ballot initiatives database 30. End users 42 having read-only access can access the above noted databases through the Internet 36 to obtain specific information regarding political campaigns and government officials. End users 42 can also obtain maps from the map database 32, as previously noted.

The online public/civic information system 10 may be implemented and secured through available encryption technology (e.g., a secure sockets layer (SSL) system). Data entry may occur by election officials (e.g., the county clerk's office) at the county level. Database updates may be done by incremental or automatic transaction voter file database updates, thus minimizing system maintenance time.

Figure 2:
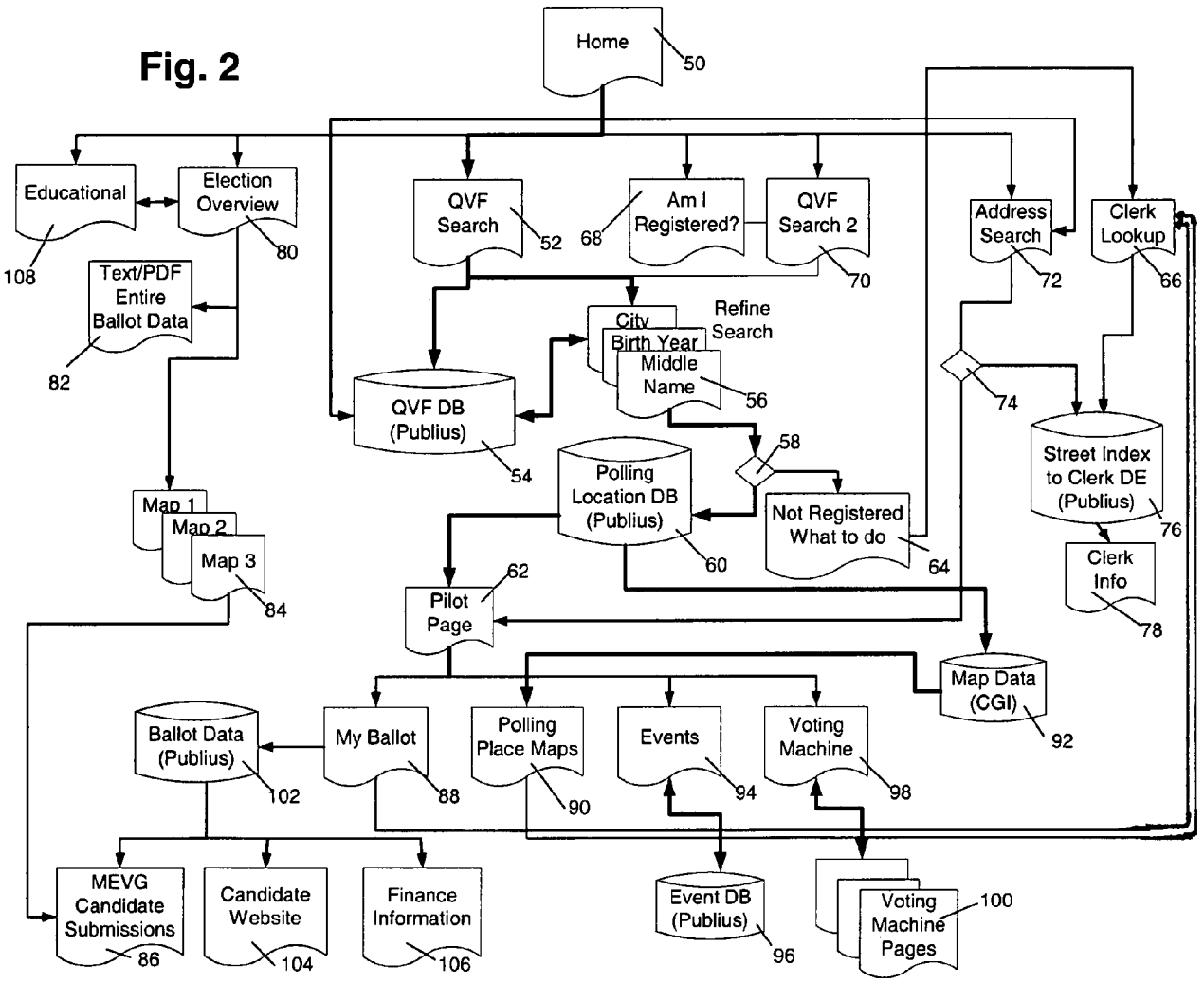
FIG. 2 is a flowchart showing the operational steps for the voter information system.

Referring now to FIG. 2, a home 50 refers to the first page the user is presented with when accessing the online voter information system 10. From the home page 50, the anticipated typical path would lead to a voter file search at 52 wherein the user of the system would enter his first and last name to be searched or queried by a voter file database 54. The voter file database 54 is maintained by state election administrators. The system provides a refined search and protects personal data by prompting the user to input an additional single search criterion such as city of residence, birth year, or middle initial as needed at limiting search fields 56. These single search criterion produce either the desired result or a numerical designator of the number of results and continue to access the registration file until the search result is narrowed to one. It would also be possible to use other search parameters. The system will continue to prompt the user for additional information at 56 until the user is positively identified as either a registered voter found in the voter file database 54 or the user is determined to be unregistered. This implementation is referred to as a "single criterion iteration methodology," or a "multiple-query resolution." According to this methodology, information about an individual voter is never presented publicly by the system, but processed discretely on the back end so that the only information presented to the user is the query result (e.g., a polling location). Single criterion queries may produce statistical or numerical results to show the user that each iteration is narrowing the field. Whenever the system determines that only one voter matches the name and refined search field, the system passes the voter name null result at 58 and the user is routed to a polling location database 60. The polling location database 60 is also maintained by a designated election administrator. The polling location database 60 generates a pilot page 62 that provides an identification of the user polling location that is used to organize information provided to the user that is specific to the jurisdiction to which all other pages are linked. If the voter name null result 58 indicates that the voter's name does not appear in the voter file database 54, the system provides instructions at 64 indicating to the user that he must register. The instruction may include directing the system to look up the identity of a clerk/registrar 66 who can assist with local voter registration.

The system can also be accessed by responding to a registered voter query at 68 where the user can query the system as to whether or not he is registered. In response to this query, the system conducts a voter file search at 70 and proceeds in the same manner as described as if the user initially requests the qualified voter file search at 52.

The system can also be accessed by entering a voter's address at address search 72. If the address is not recognized, if it was improperly entered, or if it is a new address (e.g., an address in a new subdivision that has not been previously indexed by the system), the user is directed to the local clerk/registrar for the most specific location discernable. If the address is identified after the address null result 74, the user would be directed to the pilot page 62. Clerk information is provided at 78 based on the information contained in the street index to clerk database 76.

Regional information can also be accessed through an election overview page 80. Election overview page 80 provides public information resources for a broad geographical region, as available. If the voter information system 10 is accessed via the election overview page 80, it is possible to access a file containing the text of the entire ballot for a region as maintained by the governmental agency responsible for elections. This approach bypasses the search mechanism and yields non-specific results. The user can use a map menu system at 84 to access portions of the ballot data available at 82 and also review unfiltered lists of candidate submissions at 86. Lists of candidate submissions (e.g., an electronic voter guide) 86 include biographical information provided by individual candidates. The election overview 80, statewide portions of ballot data 82, map menu system 84, and electronic voter guide 86, were previously developed and maintained by the State of Michigan in a manner described above in the background art section.

From the pilot page 62, the principle path followed by a user would be to review a jurisdiction specific ballot replica 88. The sample ballot reviewed at 88 is based on the determination of the polling location from the polling location database 60. From the pilot page 62, the user may also map the polling location at 90. Polling place maps 90 provide maps to polling places that may include directions from the user or voter's residence to the polling place. A map database 92 is maintained by a commercial or governmental database provider so that a polling map may be generated at 90. From the pilot page 62, it is also possible to access an events listing 94. The events listing 94 is based on events posted in an events database 96. The events database 96 is maintained by the system administrator or by designated election officials. Events that may be posted in the events database include town hall meetings, debates, appearances of candidates, and similar events.

The pilot page 62 also provides access to voting machine information 98. Voting machine information 98 is provided based on information in the polling location database 60 profiling what voting machines are available at each particular polling location. A series of voting machine pages 100 may be accessed that provide information regarding the particular voting machine used at the polling place if more than one machine is used at that location.

A ballot database 102 is also maintained to provide ballot information. The ballot database 102 is accessed by the system to create the sample ballot replica 88. The ballot database 102 includes all of the candidates' names and all ballot initiatives for any given election and is maintained centrally by a system administrator and updated by election officials. The ballot database 102 may include links to additional information including candidate submissions 86 or external candidate campaign information or websites 104. Candidate websites 104 may be created by candidates. Other external information such as links to nonpartisan public interest research, news media, or streaming video of speeches or debates may be included in the ballot database 102.

Campaign finance information 106 is available and may also be reached by a link from the ballot database 102. Finance information 106 includes campaign finance information to be reported by candidates, as required by statute. This information can also be accessed from links maintained on the ballot database 102.

The system may be used as statewide voter "tickler" system that uses the information in the voter file to notify registered voters by e-mail of elections, should the individual users opt for notification. The system may be widely publicized to encourage public use of the system. The system may allow for access to the disabled by, for example, employing text-to-voice and voice-to-text technologies for the blind.

The civic information system, when connected to complete election information, may also be used to process mock-election votes through an educational page 108. The educational page 108 is designed to teach students about government, the election process, voting, citizenship, and democracy. The system may be used in schools and elsewhere as an educational aid. The educational page 108 may be connected to or integrated with the election overview page 80. In one example, the educational page 108 may be a mock election module. The mock election system may be used independently or combined with additional information about how elections are run. The mock election system may be accessible from the home 50 or the election overview page 80.

It is an objective of the present invention to maintain both the real confidentiality of user information as well as the appearance of privacy of user information. The single criterion iteration methodology may be employed for this purpose. User attributes that are used to narrow search parameters may not be revealed to the user. The system may ask a user questions, one at a time, to narrow the query. The system may present the user with information about his polling place and candidates in his locale after the voter is specifically identified. Such an approach is necessary to make users feel secure and to increase trust in the system. This is critical to achieving widespread acceptance and use.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for providing voter information on line from at least one publicly accessible database comprising:

querying a user of a remote terminal that is remote from and is connected to the at least one database as to an identification data item, the at least one database including a registered voter registration file;

checking the identification data item against the database that has a field corresponding to a set of polling locations to select one polling location to which the identification data item is assigned;

identifying a particular voter from the registered voter registration file if the identification data item is found in the at least one database, wherein the voter is identified without revealing selected information contained in the registered voter registration file about the voter; and displaying at the remote terminal an information page relating to the one polling location, the information page presenting the user with information relating specifically to the one polling location of the identified voter.

2. The method according to claim 1 further comprising:

retrieving a voter polling location in a polling location database; and presenting the user with an option from the information page to view a sample ballot that the voter will encounter when voting on election day.

3. The method according to claim 1 further comprising:

presenting the user with an option from the information page to view voter information, candidate information, party information, campaign information, candidate web sites, and candidate submissions including biographical information provided by the individual candidates.

4. The method according to claim 3 wherein the candidate information is directly updated by administration personnel in each municipality via a secure connection to a database, the update further comprising validating the authenticity of the candidate information.

5. The method according to claim 1 further comprising:

presenting the user with an option to view at least one of a regional election overview, voting machine instructions, and a drill-down mapping system.

6. The method according to claim 1 further comprising:

presenting the user with an option to retrieve at least one map from a map database directing the user to a polling place.

7. The method according to claim 1 further comprising:

presenting the user with an option to view a listing of events retrieved from an election events database.

8. The method according to claim 7 wherein the election events database comprises information on at least one of elections, town hall meetings, debates, and appearances of candidates.

9. The method according to claim 1 further comprising:

presenting the user with an option to view information from a ballot database, the information comprising at least one of links to candidate submissions, links to candidate web sites, and links to candidate campaign finance information.

10. The method according to claim 9 wherein the information from the ballot database may include messages in streaming video format.

11. The method according to claim 1 wherein the displaying step further comprises:

presenting the user with an option on the information page to display a sample ballot that the voter will encounter when voting on election day;

presenting the user with an option on the information page to display campaign websites, candidate submissions including biographical information provided by individual candidates; and presenting the user with an option on the information page to display at least one of a regional election overview, a set of voting machine instructions, and a drill-down mapping system.

12. The method according to claim 1 further comprising:

assembling a polling place based database for a region having multiple jurisdictions that are divided into different subdivisions, wherein the subdivisions may be in one or more jurisdictions.

13. The method according to claim 1 further comprising:

presenting the user with contact information for a person with whom the voter should register to vote if the voter is not identified in the registered voter registration file.

14. The method according to claim 1 wherein a secure system is implemented for data exchange and information is updated in the voter registration file.

15. The method according to claim 1 further comprising:

offering access to the blind by allowing the user to convert text-to-voice and voice-to-text.

16. The method according to claim 1 wherein the information page is dynamically generated based on the jurisdiction of the voter recorded in the registered voter registration file and a system presenting the information page need not store a unique ballot for every user in the registered voter registration file.

17. The method according to claim 1 wherein the information page is pre-calculated for statistical correlations and assembled according to the fastest possible construction.

18. The method according to claim 1 wherein the registered voter registration file is used for a constituent lookup to allow legislators to perform a voter query to know the precinct in which registered voters are assigned.

19. The method according to claim 1 further comprising:

presenting the user with an option to view educational information designed to teach about a political system and a voting process.

20. The method according to claim 19 further comprising:

allowing the user to participate in an online mock election.

21. The method of claim 1 wherein the information page comprises a list of current officials.

22. The method of claim 1 wherein the step of displaying an information page further comprises presenting the user with selected public information about the voter polling location based on a jurisdiction associated with the voter.

23. A method for providing voter information on line from at least one publicly accessible database comprising:

querying a user of a remote terminal that is remote from and is connected to the at least one database as to an identification data item;

checking the identification data item against the database that has a field corresponding to a set of polling locations to select one polling location to which the identification data item is assigned;

identifying the user if the identification data item is found in the at least one database; and displaying at the remote terminal an information page relating to the one polling location, the information page presenting the user with information relating specifically to the one polling location and further presenting the user with an option to retrieve operational instructions on a voting machine that the user will encounter on election day, the polling location and voting machine being specific to the identified user.

*24. A method for providing voter information on line from at least one publicly accessible database comprising:*

*querying a user of a remote terminal that is remote from and is connected to the at least one database as to an identification data item, the at least one database including a registered voter registration file;*

*checking the identification data item against the database that has a field corresponding to a set of polling locations to select one polling location to which the identification data item is assigned;*

*identifying a particular voter from the registered voter registration file if the identification data item is found in the at least one database, wherein the voter is identified without revealing selected information contained in the registered voter registration file about the voter; and*

*generating at the remote terminal an information page relating to the one polling location, the information page presenting the user with information relating specifically to the one polling location of the identified voter.*

*25. The method according to claim 24 further comprising:*

*retrieving a voter polling location in a polling location database; and*

*presenting the user with an option from the information page to view a sample ballot that the voter will encounter when voting on election day.*

*26. The method according to claim 24 further comprising:*

*presenting the user with an option from the information page to view voter information, candidate information, party information, campaign information, candidate web sites, and candidate submissions including biographical information provided by the individual candidates.*

*27. The method according to claim 26 wherein the candidate information is directly updated by administration personnel in each municipality via a secure connection to a database, the update further comprising validating the authenticity of the candidate information.*

*28. The method according to claim 24 further comprising:*

*presenting the user with an option to view at least one of a regional election overview, voting machine instructions, and a drill-down mapping system.*

*29. The method according to claim 24 further comprising:*

*presenting the user with an option to retrieve at least one map from a map database directing the user to a polling place.*

*30. The method according to claim 24 further comprising:*

*presenting the user with an option to view a listing of events retrieved from an election events database.*

*31. The method according to claim 30 wherein the election events database comprises information on at least one of elections, town hall meetings, debates, and appearances of candidates.*

*32. The method according to claim 24 further comprising:*

*presenting the user with an option to view information from a ballot database, the information comprising at least one of links to candidate submissions, links to candidate web sites, and links to candidate campaign finance information.*

*33. The method according to claim 32 wherein the information from the ballot database may include messages in streaming video format.*

*34. The method according to claim 24 wherein the generating step further comprises:*

*presenting the user with an option on the information page to display a sample ballot that the voter will encounter when voting on election day;*

*presenting the user with an option on the information page to display campaign websites, candidate submissions including biographical information provided by individual candidates; and*

*presenting the user with an option on the information page to display at least one of a regional election overview, a set of voting machine instructions, and a drill-down mapping system.*

*35. The method according to claim 24 further comprising:*

*assembling a polling place based database for a region having multiple jurisdictions that are divided into different subdivisions, wherein the subdivisions may be in one or more jurisdictions.*

*36. The method according to claim 24 further comprising:*

*presenting the user with contact information for a person with whom the voter should register to vote if the voter is not identified in the registered voter registration file.*

*37. The method according to claim 24 wherein a secure system is implemented for data exchange and information is updated in the voter registration file.*

*38. The method according to claim 24 further comprising:*

*offering access to the blind by allowing the user to convert text-to-voice and voice-to-text.*

*39. The method according to claim 24 wherein the information page is dynamically generated based on the jurisdiction of the voter recorded in the registered voter registration file and a system presenting the information page need not store a unique ballot for every user in the registered voter registration file.*

*40. The method according to claim 24 wherein the information page is pre-calculated for statistical correlations and assembled according to the fastest possible construction.*

*41. The method according to claim 24 wherein the registered voter registration file is used for a constituent lookup to allow legislators to perform a voter query to know the precinct in which registered voters are assigned.*

*42. The method according to claim 24 further comprising:*

*presenting the user with an option to view educational information designed to teach about a political system and a voting process.*

*43. The method according to claim 42 further comprising:*

*allowing the user to participate in an online mock election.*

*44. The method of claim 24 wherein the information page comprises a list of current officials.*

*45. The method of claim 24 wherein the step of generating an information page further comprises presenting the user with selected public information about the voter polling location based on a jurisdiction associated with the voter.*

*46. A method for providing voter information on line from at least one publicly accessible database comprising:*

*querying a user of a remote terminal that is remote from and is connected to the at least one database as to an identification data item;*

*checking the identification data item against the database that has a field corresponding to a set of polling locations to select one polling location to which the identification data item is assigned;*

*identifying the user if the identification data item is found in the at least one database; and*

*generating at the remote terminal an information page relating to the one polling location, the information page presenting the user with information relating specifically to the one polling location and further presenting the user with an option to retrieve operational instructions on a voting machine that the user will encounter on election day, the polling location and voting machine being specific to the identified user, wherein the voter is identified without revealing selected information contained in the registered voter registration file about the voter.*

* * * * *